United States Patent
Chen et al.

(10) Patent No.: US 11,667,304 B2
(45) Date of Patent: Jun. 6, 2023

(54) ENHANCED VEHICLE OPERATION

(71) Applicant: Ford Global Technologies, LLC, Dearborn, MI (US)

(72) Inventors: Xingping Chen, Troy, MI (US); Jeremy Lerner, Southfield, MI (US); Mohammad Abouali, Canton, MI (US); Scott Huggins, Novi, MI (US); Navid Tafaghodi Khajavi, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 138 days.

(21) Appl. No.: 17/318,237

(22) Filed: May 12, 2021

(65) Prior Publication Data
US 2022/0363278 A1    Nov. 17, 2022

(51) Int. Cl.
*B60W 50/06* (2006.01)
*G06V 20/56* (2022.01)

(52) U.S. Cl.
CPC .......... *B60W 50/06* (2013.01); *G06V 20/588* (2022.01); *B60W 2420/403* (2013.01); *B60W 2552/53* (2020.02); *B60W 2554/4045* (2020.02)

(58) Field of Classification Search
CPC ............ B60W 50/06; B60W 2552/53; B60W 2554/4045; B60W 2420/403; G06V 20/588
USPC .......................................................... 701/36
See application file for complete search history.

(56) References Cited

U.S. PATENT DOCUMENTS

| | | | |
|---|---|---|---|
| 9,530,313 B2 | 12/2016 | Dannenbring | |
| 10,762,365 B2 | 9/2020 | Ewert | |
| 2017/0307746 A1* | 10/2017 | Rohani | G01S 13/931 |
| 2017/0343372 A1* | 11/2017 | Vandanapu | G01C 21/3602 |
| 2020/0025575 A1* | 1/2020 | Weissman | G01S 17/06 |
| 2021/0097313 A1* | 4/2021 | Fox | G06V 10/803 |

FOREIGN PATENT DOCUMENTS

| | | | |
|---|---|---|---|
| CN | 107430839 | * | 3/2016 |
| DE | 102019001041 A1 | | 2/2020 |
| DE | 102019004623 A1 | | 2/2020 |
| DE | 102020001347 A1 | | 10/2020 |

OTHER PUBLICATIONS

Chiung-Yao Fang, Road-Sign Detection and Tracking, Sep. 2003, IEEE Transactions on Vehicular Technology, vol. 52, No. 5, (Year: 2003).*

* cited by examiner

*Primary Examiner* — Elaine Gort
*Assistant Examiner* — Matthias S Weisfeld
(74) *Attorney, Agent, or Firm* — Frank A. MacKenzie; Beiin Bieneman PLC

(57) ABSTRACT

While operating a vehicle, a candidate marker is detected via first image data from a first image sensor. Upon failing to identify the candidate marker, vehicle exterior lighting is actuated to illuminate the candidate marker. Then the candidate marker is determined to be one of a real marker or a projected marker based on determining whether the candidate marker is detected via second image data from the first image sensor. Upon determining the candidate marker is the real marker, the vehicle is operated based on the real marker.

20 Claims, 6 Drawing Sheets

ENHANCED VEHICLE OPERATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

Figure 1:
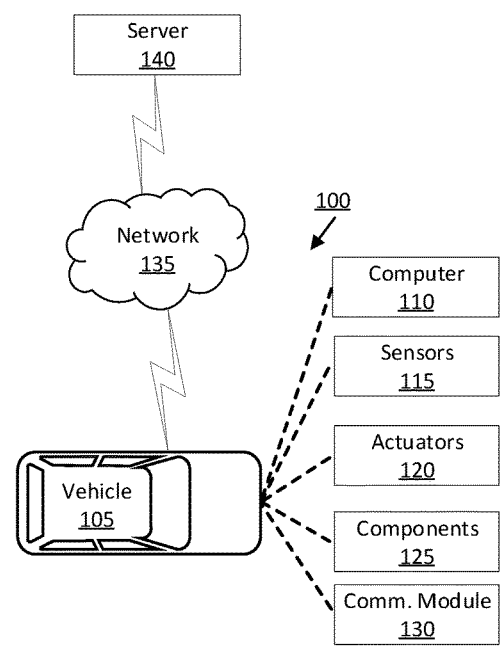
FIG. 1 is a block diagram of an example control system for a vehicle.

The presently disclosed solution provides improved object detection technology, e.g., to support improved operation of vehicles that operate according to object detection. A vehicle computer may receive data from various sensors that can be interpreted to identify or detect various objects. Misidentification of objects can occur when sensor data is incomplete or inaccurate, including when an object, perhaps by design or intention of someone providing or modifying the object, appears to be something it is not. As one example, a vehicle computer may detect an object that appears to be a marker but in fact is not. A "marker" is a physical object on or near, e.g., next to or above, a road that governs vehicle operation. For example, a projection, e.g., on a building, wall, screen, etc., can appear similar to a marker when sensor data is interpreted, but does not govern vehicle operation. A "projection" is a representation of an object on a surface achieved by projecting light. A projection can provide an object that appears to vehicle sensors to be similar to another object, such as a marker, e.g., a projected object could be a red octagon that includes the word "STOP," thus appearing similar to a stop sign typically on a road.

More accurately identifying markers, such as road signs, improves operation of the vehicle by reducing false or inaccurate object identification that could result in inaccurate vehicle operation. In one example, upon detecting a marker not included in a map, a vehicle computer can actuate exterior lighting of the vehicle to illuminate the marker. Illuminating the marker can provide improved data for sensors to determine that the marker is an actual (i.e., physically real) marker rather than a projection. That is, illumination of the marker can be implemented to distinguish features of an actual marker from a projection more accurately by detecting reflected light from features of actual markers that differs from light reflected by projections, e.g., surfaces and/or objects underlying the projections. Present techniques for processing images collected by vehicle sensors can therefore reduce false positive identification of projections.

A system includes a computer including a processor and a memory, the memory storing instructions executable by the processor to, while operating a vehicle, detect a marker via first image data from a first image sensor. The instructions further include instructions to, upon failing to verify the marker via a map, actuate vehicle exterior lighting to illuminate the marker. The instructions further include instructions to then determine that the marker is one of an actual marker or a projection based on determining whether the marker is detected via second image data from the first image sensor. The instructions further include instructions to, upon determining the marker is the actual marker, operate the vehicle based on the actual marker.

The instructions can further include instructions to, upon detecting the marker, prevent actuation of a propulsion component in the vehicle until determining whether the marker is the actual marker or the projection.

The instructions can further include instructions to, upon determining the marker is the projection, ignore the projection.

The instructions can further include instructions to determine that the marker is one of the actual marker or the projection additionally based on determining whether the marker is detected via non-image sensor data.

The instructions can further include instructions to determine that the marker is one of the actual marker or the projection additionally based on stored vehicle operation data.

The instructions can further include instructions to determine that the marker is one of the actual marker or the projection additionally based on determining whether a second vehicle is operating according to the marker.

The instructions can further include instructions to determine that the marker is one of the actual marker or the projection additionally based on determining whether the marker is detected via image data from a second image sensor.

The instructions can further include instructions to, upon determining the marker is the actual marker, verify an operating parameter associated with the actual marker based on stored vehicle operation data.

The instructions can further include instructions to determine that the marker is one of the actual marker or the projection additionally based on determining whether the marker is detected for a predetermined time.

The instructions can further include instructions to, upon generating an image from the first image data, determine that the marker is one of the actual marker or the projection additionally based on determining whether the marker is detected in the image.

The instructions can further include instructions to generate the image by using a virtual sensor having a same perspective of the marker as the first image sensor and having a different magnification than the first image sensor.

The instructions can further include instructions to provide a message specifying the marker is one of the actual marker or the projection to a remote computer.

The instructions can further include instructions to, upon verifying the marker via the map, operate the vehicle based on the verified marker.

The system may include a remote computer including a second processor and a second memory, the second memory storing instructions executable by the second processor to generate the map based on aggregated data including messages from a plurality of vehicles identifying the marker.

A method includes, while operating a vehicle, detecting a marker via first image data from a first image sensor. The method further includes, upon failing to verify the marker, actuating vehicle exterior lighting to illuminate the marker. The method further includes then determining that the marker is one of an actual marker or a projection based on determining whether the marker is detected via second image data from the first image sensor. The method further includes, upon determining the marker is the actual marker, operating the vehicle based on the actual marker.

The method can further include determining whether marker is one of the actual marker or the projection additionally based on determining whether the marker is detected via non-image sensor data.

The method can further include determining whether the marker is one of the actual marker or the projection additionally based on stored vehicle operation data.

The method can further include determining whether the marker is one of the actual marker or the projection additionally based on determining whether a second vehicle is operating according to the marker.

The method can further include determining whether the marker is one of the actual marker or the projection additionally based on determining whether the marker is detected via image data from a second image sensor.

The method can further include determining whether the marker is one of the actual marker or the projection additionally based on determining whether the marker is detected for a predetermined time.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-3C, an example control system 100 includes a vehicle 105. A vehicle computer 110 in the vehicle 105 receives data from sensors 115. The vehicle computer 110 is programmed to, while operating the vehicle 105, detect a marker 300 via first image data from a first image sensor 115. The vehicle computer 110 is further programmed to, upon failing to verify the marker 300 via a map, actuate vehicle 105 exterior lighting to illuminate the marker 300. The vehicle computer 110 is further programmed to then determine that the marker 300 is one of an actual, i.e., physical, marker 300 or a projection 305 based on determining whether the marker 300 is detected via second image data from the first image sensor 115. The vehicle computer 110 is further programmed to, upon determining the marker 300 is the actual marker 300, operate the vehicle 105 based on the actual marker 300.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
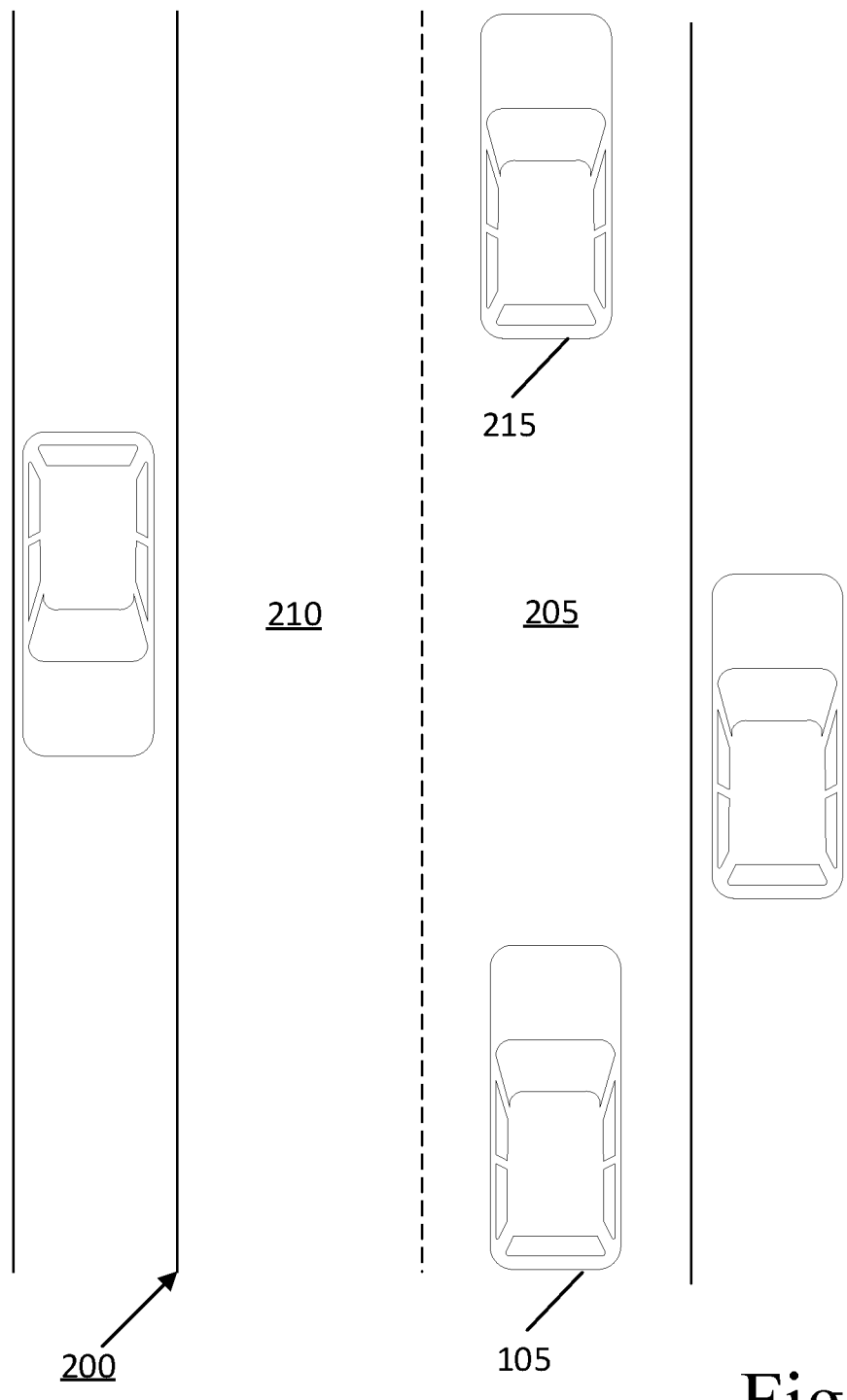
FIG. 2 is a block diagram of the vehicle operating in an example lane of an example road.
Figure 3A:
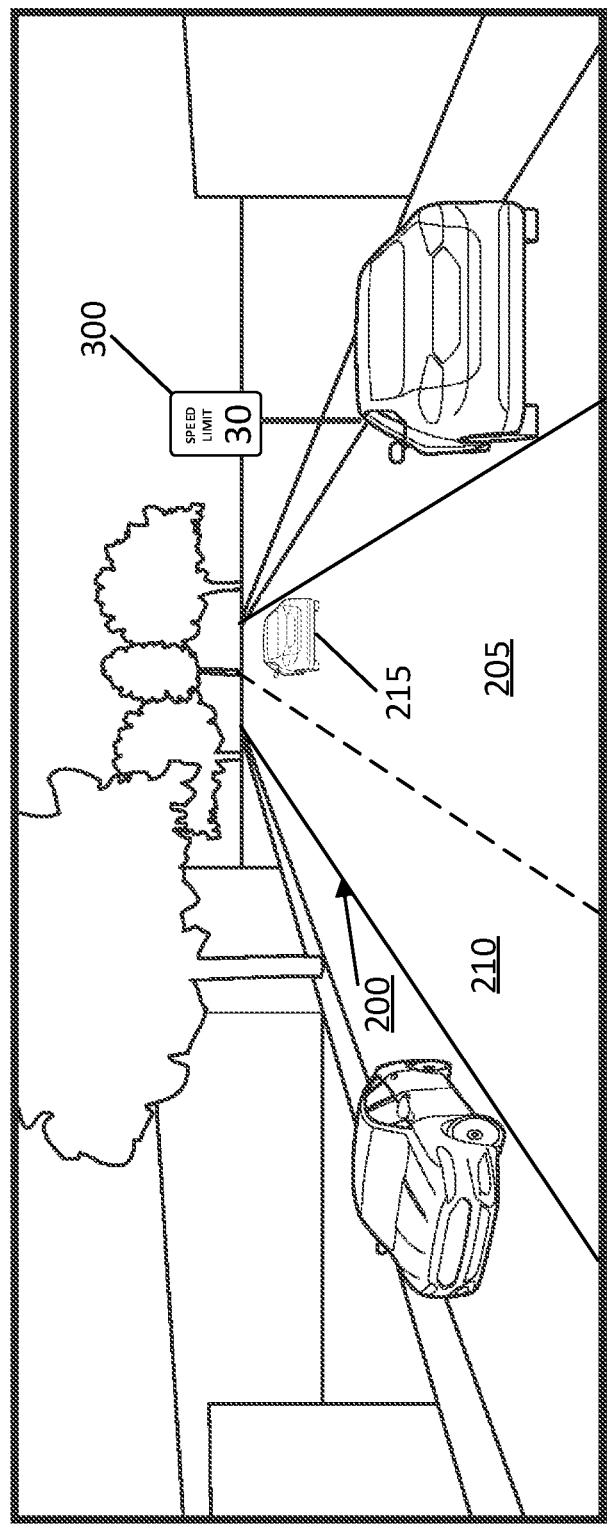
FIGS. 3A-3B are example first images including a marker.
Figure 3B:
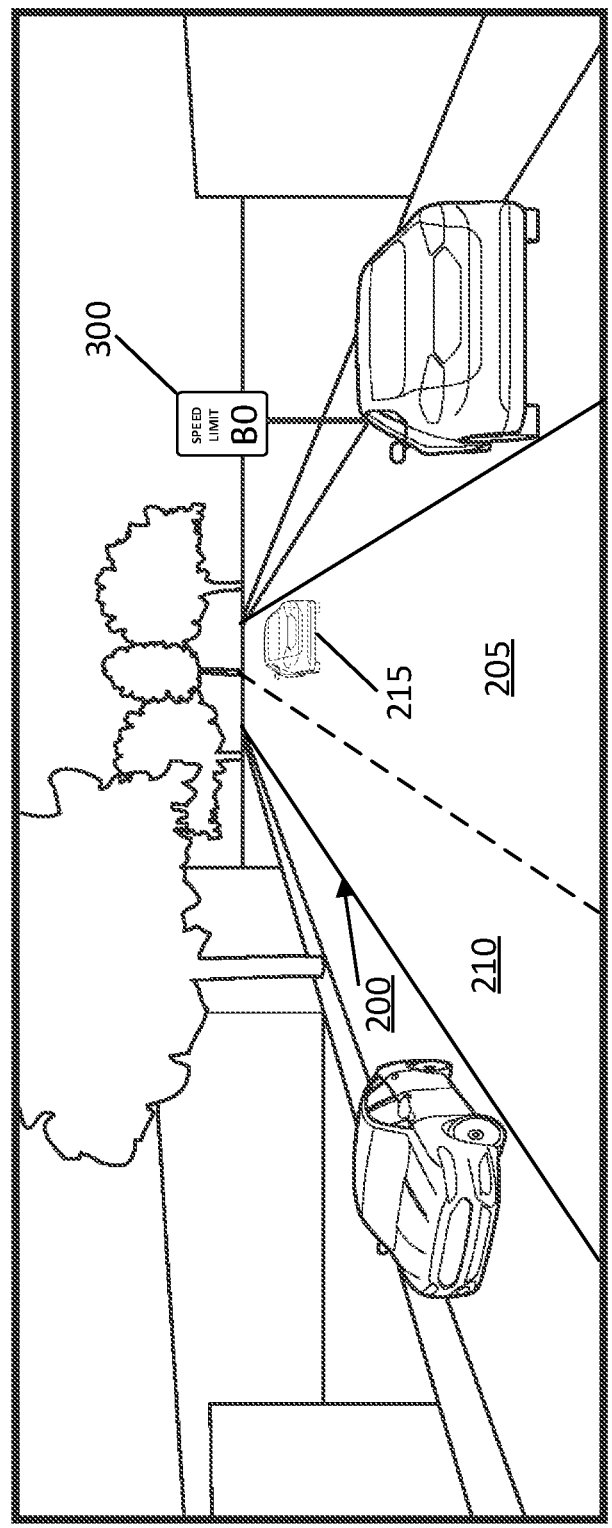
Figure 3C:
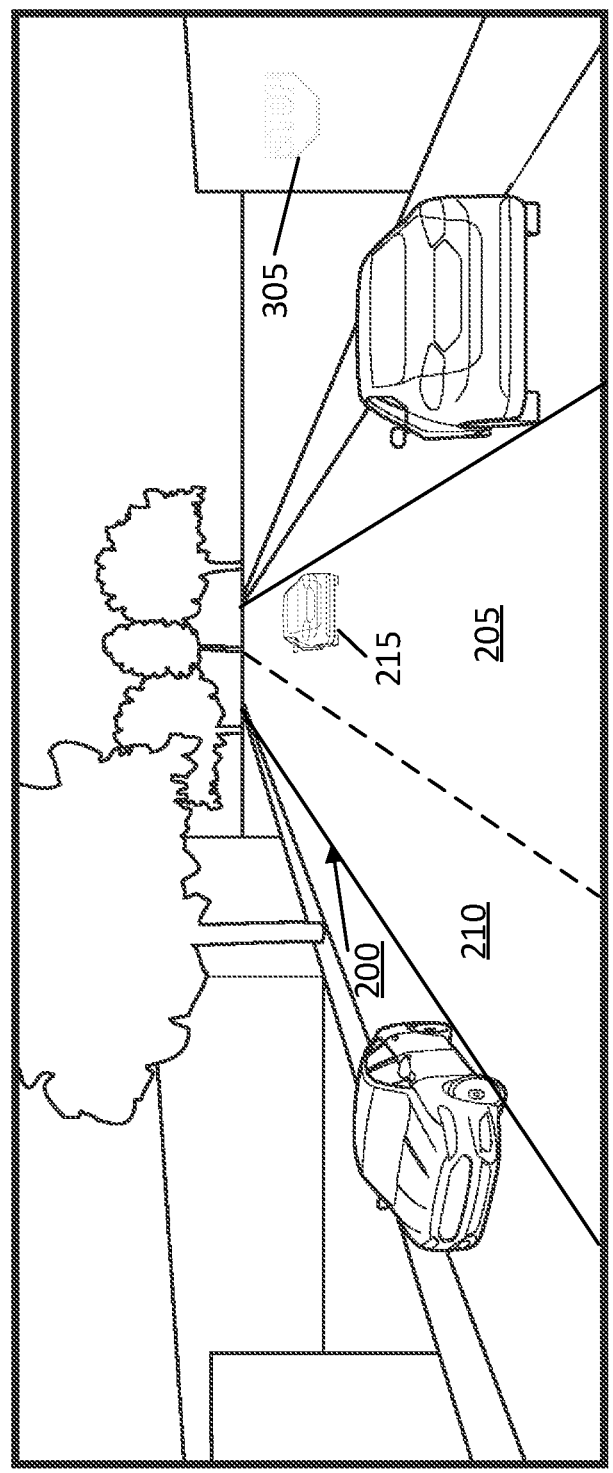
FIG. 3C is an example first image including a projection.

FIG. 2 is a diagram illustrating a vehicle 105 operating in an example lane 205 of an example road 200. A road herein, unless specified otherwise, means any ground surface designated for travel of a vehicle. Typically, a road includes a prepared travel surface, e.g., graded dirt, asphalt, gravel, etc. Further, a road typically includes markings, e.g., paint, embedded markers, etc., to guide vehicle travel, e.g., in one or more lanes. A road can include more than one lane for vehicle travel; each lane can be designated for travel in a specified direction. A lane is a specified area of the road for vehicle travel. A lane of a road is an area defined along a length of a road, typically having a width to accommodate only one vehicle, i.e., such that multiple vehicles can travel in a lane one in front of the other, but not abreast of, i.e., laterally adjacent, one another.

While operating in the road 200, the vehicle computer 110 may be programmed to identify a current lane 205, i.e., a lane in which the vehicle 105 is operating, and one or more target lanes 210, i.e., a lane in which the vehicle 105 is not operating, on the road 200. For example, the vehicle computer 110 can receive map data and/or location data, e.g., GPS data, from a remote server computer 140 specifying the current lane 205 and the target lane 210(s). As another example, the vehicle computer 110 may identify the current lane 205 and the target lane 210(s) based on sensor 115 data. For example, the vehicle computer 110 can be programmed to receive sensor 115 data, e.g., image data, radar data, LIDAR data, etc. from sensors 115 and to implement various data processing techniques to identify the current lane 205 and the target lane 210(s). For example, lanes can be indicated by markings, e.g., painted lines on the road 200, and image recognition techniques, such as are known, can be executed by the vehicle computer 110 to identify the current lane 205 from image data. For example, the vehicle computer 110 can identify solid lane markings on opposite sides of the vehicle 105. The vehicle computer 110 can then identify the current lane 205 of vehicle 105 operation based on a number of groups of dashed lane markings between each side of the vehicle 105 and the respective solid lane marking. A solid lane marking is a marking extending continuously, i.e., is unbroken, along a length of a road 200 and defining at least one boundary of a lane. A group of dashed lane markings includes a plurality of markings spaced from each other along a length of a road 200 and defining at least one boundary of a lane. Additionally, the vehicle computer 110 can determine the target lane 210(s) on each side of the current lane 205 based on the number of groups of dashed lane markings on each side of the vehicle 105 (e.g., a number of target lanes 210 is equal to the number of groups of dashed lane markings).

While operating in the current lane 205, the vehicle computer 110 can receive sensor 115 data of the environment around the vehicle 105 in the current lane 205. The sensor 115 data can include one or more objects around the vehicle 105. For example, the vehicle computer 110 can be programmed to classify and/or identify types of objects based on the sensor 115 data. For example, suitable object classification or identification techniques, e.g., such as mentioned below, can be used, e.g., in the vehicle computer 110 based on lidar sensor 115 data, camera sensor 115 data, etc., to classify and/or identify a type of object, as well as physical features of objects. Non-limiting examples of types of objects include a marker 300, such as another vehicle, a road sign (see FIGS. 3A-3C), a pedestrian, etc., a building, a pole, foliage, etc.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle 105 sensor 115 data, e.g., an image, and then provide as output, for each of one or more respective regions of interest in the image, an identification and/or a classification of one or more types of objects or an indication that no object is present in the respective region of interest. Further, a coordinate system (e.g., polar or cartesian) applied to an area proximate to the vehicle 105 can be used to specify locations and/or areas (e.g., according to the vehicle coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon identifying the type of object as a marker 300, the vehicle computer 110 is programmed to identify the marker 300. The vehicle computer 110 can operate the vehicle 105 based on the identified marker 300, as discussed below. To identify the marker 300, the vehicle computer 110 can actuate a first image sensor 115 to collect first image data including the marker 300. The vehicle computer 110 can identify the marker 300, for example, by using image processing techniques, such as text recognition, a neural network, etc., on the first image data to identify at least one of a shape, a color, and/or text on the marker 300. The vehicle computer 110 can then determine an operating parameter associated with the marker 300. An operating parameter herein is an expected value of a measurement of a physical characteristic of a vehicle 105 or an environment around that vehicle 105 while the vehicle 105 is operating on the road 200. A variety of operating parameters may be determined for a vehicle 105 operating on the road 200. A non-limiting list of operating parameters includes a speed of the vehicle 105, a following distance between vehicles, a stopping location on the road 200, an acceleration rate of the vehicle 105, etc.

To determine the operating parameter, the vehicle computer 110 can, for example, compare the identification to a predetermined library of marker 300 data stored, e.g., in a memory of the vehicle computer 110, including the operating parameter associated with each marker 300 and the lanes 205, 210 governed by the each marker 300. As another example, the classifier can be further trained with data known to represent various markers 300. Thus, in addition to identifying the object as a marker 300, the classifier can output an identification of the marker 300, including the operating parameter associated with the marker 300 and the lanes 205, 210 governed by each marker 300. Once trained, the classifier can accept as input the first image data, and then provide as output for each of one or more respective regions of interest in the first image data, an identification of a marker 300, or that no marker 300 is present in the respective region of interest.

Upon identifying the marker 300, the vehicle computer 110 is programmed to determine a verification of the marker 300. That is, the vehicle computer 110 can determine whether the identified marker 300 is verified or unverified. The marker 300 is verified when the vehicle computer 110 correlates the marker 300 with a marker specified by a stored map of the road 200, i.e., location coordinates specified by the map for the marker 300. The marker 300 is unverified when the vehicle computer 110 is unable to correlate the marker 300 with a marker specified by the map, i.e., location coordinates specified by the map for the marker 300. The vehicle computer 110 can receive the map of the road 200, e.g., from the remote server computer 140. The map specifies the markers 300 along the road 200, e.g., based on aggregated data (as discussed below).

To determine the verification of the marker 300, the vehicle computer 110 can determine a location, e.g., geo-coordinates, of the marker 300 based on sensor 115 data, e.g., LIDAR data, radar data, image data, etc. For example, the vehicle computer 110 can determine the location of the marker 300 based on the first image data. In such an example, the vehicle computer 110 can, for example, employ free space computation techniques to the first image data that identifies a range of pixel coordinates associated with the marker 300 and free space (i.e., space in which no object is detected) between the vehicle 105 and the marker 300. By identifying a set of pixel coordinates in the first image associated with the free space and the marker 300 and determining a distance (in pixel coordinates) from a lens of the first image sensor 115, e.g., across the free space, to the marker 300 in pixel coordinates, the vehicle computer 110 can then determine a distance, e.g., across the free space, of the lens of the first image sensor 115 from the marker 300. That is, according to known techniques, for example, the vehicle computer 110 can determine a distance from the lens of the first image sensor 115 to the identified coordinates (in pixel coordinates) and can further determine, from the first image, an angle between a line from the first image sensor 115 lens to a point on the marker 300, and an axis extending from the lens parallel to the longitudinal axis of the vehicle 105. The vehicle computer 110 may then receive a location of the vehicle 105, e.g., from a sensor 115, a navigation system, the remote server computer 140, etc. The location of the vehicle 105 is combined with the distance and the angle, e.g., using geometric transformation, to determine the location of the marker 300. The vehicle computer 110 can transmit the location of the detected marker 300 to the remote server computer 140, e.g., via the network 135.

Upon determining the location of the marker 300, the vehicle computer 110 can access the map, e.g., from a memory of the vehicle computer 110. The vehicle computer 110 can then compare the location of the marker 300 to the map, e.g., to determine whether the map specifies the marker 300 at or near (i.e., within a predetermined radius of the location that is determined based on a margin of error of the map) the location. If the map specifies the marker 300 at (or near) the location, then the vehicle computer 110 determines that the marker 300 is verified. If the map does not specify the marker 300 at (or near) the location (e.g., the map specifies another marker 300 at (or near) the location or no marker 300 at (or near) the location), then the vehicle computer 110 determines that the marker 300 is unverified. The vehicle computer 110 can transmit the verification of the detected marker 300, i.e., whether the detected marker 300 is verified or unverified, to the remote server computer 140, e.g., via the network 135.

Upon determining that the marker 300 is verified, the vehicle computer 110 can be programmed to operate the vehicle 105 based on the verified marker 300. For example, when the verified marker 300 governs vehicle operation in the current lane 205, the vehicle computer 110 can actuate one or more vehicle components 125 according to the operating parameter associated with the verified marker 300. That is, the vehicle computer 110 can control the vehicle 105 to satisfy, i.e., meet the criteria specified by, the operating parameter associated with the verified marker 300. Alternatively, when the verified marker 300 does not govern vehicle operation in the current lane 205, the vehicle computer 110 can ignore the verified marker 300. That is, the vehicle computer 110 can determine not to actuate one or more vehicle components 125 according to the operating parameter associated with the verified marker 300.

The memory of the vehicle computer 110 can include one or more instructions to vehicle components 125 based on the specific operating parameter, and the vehicle computer 110 can actuate the vehicle components 125 according to the instructions stored in the memory. For example, if the operating parameter is a "stop" command, the vehicle computer 110 can actuate a brake component 125 to stop the vehicle 105 prior to reaching the marker 300. In another example, if the operating parameter is a speed, the vehicle computer 110 can actuate a propulsion component 125 to maintain a vehicle 105 speed at the speed.

Upon determining that the marker 300 is unverified, the vehicle computer can enable an idle mode, i.e., transition the idle mode from a disabled state to an enabled state. The idle mode prevents actuation of a propulsion component 125 of the vehicle 105. That is, in the idle mode, the vehicle computer 110 is prevented from increasing a speed of the vehicle 105. For example, the vehicle computer 110 may not send instructions to the propulsion component 125 when the idle mode is enabled. Additionally, the vehicle computer 110 can send instructions to pre-charge a brake component 125 when the idle mode is enabled. Additionally, or alternatively, the idle mode may prevent the vehicle computer 110 from performing a lane change operation, i.e., operating the vehicle 105 to depart the current lane 205. For example, in the idle mode, the vehicle computer 110 may not send, or may be prevented from sending, instructions to a steering component 125 to direct the vehicle 105 across a lane marking.

Additionally, the vehicle computer 110 is programmed to determine whether the unverified marker 300 is an actual marker 300 (see FIGS. 3A and 3B) or a projection 305 (see FIG. 3C) based on one or more object detection and/or identification techniques (as discussed below). For example, the vehicle computer 110 can determine whether the unverified marker 300 is an actual marker 300 or a projection 305 based on Equation 1 below:

$$C = T_1 x_1 + T_2 x_2 + T_3 x_3 + T_4 x_4 + T_5 x_5 + T_6 x_6 + T_7 x_7 \quad (1)$$

where C is a confidence score, $T_1$, $T_2$, $T_3$, $T_4$, $T_5$, $T_6$, and $T_7$ are numerical values representing corresponding object detection and/or identification techniques (as discussed below), and $x_1$, $x_2$, $x_3$, $x_4$, $x_5$, $x_6$, and $x_7$ are empirically determined coefficients based on empirical testing of object detection and/or identification techniques. The numerical values, $T_1$, $T_2$, $T_3$, $T_4$, $T_5$, $T_6$, and $T_7$ are each a binary value, e.g., 0 or 1. For example, the vehicle computer 110 can determine the respective value of the various techniques based on determining whether the marker 300 is detected and/or identified using the corresponding technique. The coefficients $x_1$, $x_2$, $x_3$, $x_4$, $x_5$, $x_6$, and $x_7$ may, for example, be determined to specify which of the techniques corresponds to a higher confidence score C and which of the techniques corresponds to a lower confidence score C. That is, the coefficients $x_1$, $x_2$, $x_3$, $x_4$, $x_5$, $x_6$, and $x_7$ may specify respective weights of the techniques relative to the confidence score C.

As used herein, a "confidence score" is a numerical value, e.g., an integer, that indicates a likelihood of the unverified marker 300 being an actual marker 300. Upon determining the confidence score C, the vehicle computer 110 can compare the confidence score C to a threshold. The threshold may be determined empirically, e.g., based on testing that allows for determining a minimum confidence score at which a vehicle computer can accurately determine that an unverified marker is an actual marker. The threshold may be stored, e.g., in a memory of the vehicle computer 110. The vehicle computer 110 may store, e.g., in the memory, a plurality of thresholds corresponding to a plurality of roads 200. That is, each road 200 may be associated with a unique threshold. If the confidence score C is greater than or equal to the threshold, then the vehicle computer 110 determines that the marker 300 is an actual marker 300. If the confidence score C is less than the threshold, then the vehicle computer 110 determines that the marker 300 is a projection 305. The vehicle computer 110 can transmit a message specifying whether the unverified marker 300 is an actual marker 300 or a projection 305 to the remote server computer 140, e.g., via the network 135.

The vehicle computer 110 can determine the confidence score C based on one or more object detection and/or identification techniques. That is, the vehicle computer 110 can determine the confidence score C based on one or more of $T_1$, $T_2$, $T_3$, $T_4$, $T_5$, $T_6$, and $T_7$. Said differently, Equation 1 may include all of $T_1$, $T_2$, $T_3$, $T_4$, $T_5$, $T_6$, and $T_7$ or a subset thereof. Additionally, the vehicle computer 110 can employ the object detection and/or identification techniques in any order to determine the confidence score C. That is, $T_1$, $T_2$, $T_3$, $T_4$, $T_5$, $T_6$, and $T_7$ may be determined and/or evaluated in any order.

To determine $T_1$, the vehicle computer 110 can be programmed to actuate exterior lights, e.g., turn on headlamps, of the vehicle 105 to illuminate the unverified marker 300. Illuminating the unverified marker 300 may allow the vehicle computer 110 to determine whether the unverified marker 300 is an actual marker 305 or a projection 310 because light will be reflected by features of the actual marker 305 differently than by the projection 310, e.g., a surface or object underlying the projection 310. Upon illuminating the unverified marker 300, the vehicle computer 110 is programmed to actuate the first image sensor 115 to obtain second image data. Second image data in this context, i.e., where a first sensor 115 has obtained first and second image data, is image data obtained subsequent to the first image data. The second image data can include one or more objects around the vehicle 105. For example, the vehicle computer 110 can input the second image data to the classifier and determine whether the unverified marker 300 is included in the second image data based on output from the classifier, as discussed above. If the vehicle computer 110 detects the unverified marker 300 in the second image data, then the vehicle computer 110 can determine the value of $T_1$ is 1. If the vehicle computer 110 fails to detect the unverified marker 300 in the second image data, e.g., if the vehicle computer 110 detects a building, a wall, foliage, etc. at a location relative to the vehicle 105 where the unverified marker 300 was detected in the first image data, then the vehicle computer 110 can determine the value of $T_1$ is 0.

To determine $T_2$, the vehicle computer 110 is programmed to actuate a second image sensor 115 to obtain image data. The second image sensor 115 has a different perspective of the unverified marker 300 than the first image sensor 115. For example, the perspective from the second image sensor 115 may be transverse and non-orthogonal to the perspective from the first image sensor 115. That is, while the perspectives are different, the perspectives of the first and second image sensors 115 each may include a same side, e.g., a front, of the marker 300. Using the second image sensor 115 to obtain an image of the unverified marker 300 may allow the vehicle computer 110 to determine whether the unverified marker 300 is an actual marker 300 or a projection 305 because a projection may appear differently in the image data as compared to the first image data. The vehicle computer 110 can, for example, input the image data to the classifier and determine whether the unverified marker 300 is included in the image data based on output from the classifier, as discussed above. If the vehicle computer 110 detects the unverified marker 300 in the image data from the second image sensor 115, e.g., if the vehicle computer 110 detects a building, a wall, foliage, etc. at a location relative to the vehicle 105 where the unverified marker 300 was detected in the first image data, then the vehicle computer 110 can determine the value of $T_2$ is 1. If the vehicle computer 110 fails to detect the unverified marker 300 in the image data from the second image sensor 115, then the vehicle computer 110 can determine the value of $T_2$ is 0.

To determine $T_3$, the vehicle computer 110 can analyze stored vehicle operation data for the location of the unverified marker 300. In this context, "vehicle operation data" are data describing operation of vehicles, i.e., operation data are data measuring various vehicle attributes as the vehicle operates on a road. The vehicle operation data can include, e.g., speed data, acceleration data, braking data, turning data, etc. That is, as vehicles operate at the location of the unverified marker 300, the vehicle operation data provide measurements describing how the vehicles operate at the location. Various vehicles can provide operation data to a remote data store such as the remote server computer 140. A computer 110 in a host vehicle 105 can then receive the vehicle operation data, e.g., from the remote server computer 140. The vehicle computer 110 can compare vehicle operation data to the operating parameter associated with the unverified marker 300. If the vehicle operation data indicates that vehicles generally operate according to the operating parameter associated with the unverified marker 300, e.g., the operating parameter specifies that vehicles are to stop at the location and the vehicle operation data indicates that at least a specified percentage of (e.g. 75%) vehicles have stopped at the location, then the vehicle computer 110 can determine that the value of $T_3$ is 1. If the vehicle operation data indicates that vehicles generally do not operate according to the operating parameter associated with the unverified marker 300, e.g., the operating parameter specifies that vehicles are to stop at the location and the vehicle operation data indicates that less than the specified percentage of vehicles have stopped at the location, then the vehicle computer 110 can determine that the value of $T_3$ is 0.

To determine $T_4$, the vehicle computer 110 can analyze operation data of a second vehicle 215 operating in the current lane 205 of the road 200 or a target lane 210 of the road 200. The vehicle computer 110 can compare second vehicle 215 operation data to the operating parameter associated with the unverified marker 300. The vehicle computer 110 can determine the value of $T_4$, e.g., in substantially the same manner as discussed above regarding determining the value of $T_3$.

The vehicle computer 110 may, for example, receive the second vehicle 215 operation data, e.g., via V2V communications. As another example, the vehicle computer 110 can determine second vehicle 215 operation data based on sensor 115 data. As one example, the vehicle computer 110 may determine that the second vehicle 215 is braking based on detecting brake lights activated in image data. As another example, the vehicle computer 110 may determine a speed of the second vehicle 215 relative to the vehicle 105 by determining a change in distance between the second vehicle 215 and the vehicle 105 over time. The vehicle computer 110 may determine a distance from the vehicle 105 to the second vehicle 215 by using a lidar sensor 115, which is similar to a radar sensor 115, uses laser light transmissions (instead of radio transmissions) to obtain reflected light pulses from objects, e.g., the second vehicle 215, and the reflected light pulses can be measured to determine object distances. The vehicle computer 110 may then determine the speed of the second vehicle 215 relative to the vehicle 105 with the formula $\Delta D/\Delta T$, where $\Delta D$ is a difference between a pair of distances from the vehicle 105 to the second vehicle 215 taken at different times and ΔT is an amount of time between when the pair of distances was determined. For example, the difference between the pair of distances ΔD may be determined by subtracting the distance determined earlier in time from the distance determined later in time. In such an example, a positive value indicates that the second vehicle 215 is traveling slower than the vehicle 105, and a negative value indicates that the second vehicle 215 is traveling faster than the vehicle 105. The vehicle computer 110 can then determine the speed of the second vehicle 215 by combining, i.e., summing, the speed of the second vehicle 215 relative to the vehicle 105 to the speed of the vehicle 105 (e.g., determined based on sensor 115 data, such as wheel speed sensor 115 data).

To determine $T_5$, the vehicle computer 110 determines whether the unverified marker 300 is detected for at least a threshold portion of a predetermined time. For example, upon detecting the unverified marker 300 via the first image data, the vehicle computer 110 can initiate a timer. The timer may have a predetermined duration, e.g., 500 milliseconds, 1 second, 2 seconds, etc. The predetermined duration may be stored, e.g., in a memory of the vehicle computer 110. The predetermined duration may be determined empirically, e.g., based on testing that allows for determining an average amount of time that sensors 115 can obtain data of an object while a vehicle 105 is operating. The threshold portion may be stored, e.g., in a memory of the vehicle computer 110. The threshold portion may be determined empirically, e.g., based on testing that allows for determining an average amount of time for a vehicle computer 110 to identify a marker 300 via sensor 115 data. If the vehicle computer 110 detects the unverified marker 300 via sensor 115 data for at least the threshold portion of the predetermined time, then the vehicle computer 110 can determine the value of $T_5$ is 1. If the vehicle computer 110 fails to detect the unverified marker 300 via sensor 115 data for at least the threshold portion of the predetermined time, then the vehicle computer 110 can determine the value of $T_5$ is 0. Alternatively, the vehicle computer 110 can determine the value of $T_5$ is a ratio of the amount of an amount of time the vehicle computer 110 detected the unverified marker 300 via sensor data to the predetermined time.

To determine $T_6$, the vehicle computer 110 can actuate a non-image sensor 115, e.g., a lidar sensor 115, a radar sensor 115, an ultrasonic sensor 115, etc., to collect non-image data, e.g., lidar data, radar data, ultrasonic data, etc., of the environment around the vehicle 105. For example, the vehicle computer 110 can actuate a lidar sensor 115 to obtain lidar data of the environment around the vehicle 105. The vehicle computer 110 can analyze the non-image sensor 115 data, e.g., using data processing techniques, to determine whether the marker 300 is detected via the non-image sensor 115 data. If the vehicle computer 110 detects the unverified marker 300 via the non-image sensor 115 data, then the vehicle computer 110 can determine the value of $T_6$ is 1. If the vehicle computer 110 fails to detect the unverified marker 300 via the non-image sensor 115 data, then the vehicle computer 110 can determine the value of $T_6$ is 0.

To determine $T_7$, the vehicle computer 110 can generate an image based on the first image data. The vehicle computer 110 can then analyze the generated image, e.g., using image processing techniques, to determine whether the marker 300 is detected in the generated image. If the vehicle computer 110 detects the unverified marker 300 in the generated image, then the vehicle computer 110 can determine the value of $T_7$ is 1. If the vehicle computer 110 fails to detect the unverified marker 300 in the generated image, then the vehicle computer 110 can determine the value of $T_7$ is 0.

A virtual camera can be provided by programming of the vehicle computer 110 to generate the image from the first image data. The vehicle computer 110 can generate virtual light rays that pass from a virtual image sensor through a virtual lens, obeying the laws of physics just as if the image sensor 115 and lens were physical objects. The vehicle computer 110 inserts data into the virtual image sensor corresponding to the appearance of the portion of first image data that a ray of light emitted by the feature points of the first image data and passing through a physical lens would produce on a physical image sensor 115. By situating a virtual camera at a selected location and orientation with respect to the first image data, the generated image corresponding to a selected viewpoint with respect to the vehicle 105 can be generated.

The virtual camera point of view includes location and orientation data for an optical axis of the virtual camera and data regarding the magnification of the virtual camera lens. The virtual camera point of view is determined based on the location and orientation of a virtual camera with respect to a vehicle 105. The location and orientation of the virtual camera are selected to be the location and orientation of the first image sensor 115. That is, the virtual camera point of view corresponds to the point of view of the first image sensor 115. Said differently, the virtual camera has a same perspective of the unverified marker 300 as the first image sensor 115. Because the generated image was generated from first image data based on a virtual camera at a selected location and orientation, data regarding the location and orientation of the feature points illustrated in the generated image is known.

Additionally, the vehicle computer 110 selects a magnification of the virtual image sensor to be different than a magnification of the first image sensor 115. That is, the generated image is zoomed in or out relative to the first image data. Generating a generated image that has a different magnification than the first image data may allow the vehicle computer 110 to determine whether the unverified marker 300 is an actual marker 300 or a projection 305. For example, a projection 305 may be distorted, e.g., blurred, in the generated image such that the vehicle computer 110 is unable to detect the projection 305 in the generated image. In other words, a projection 305 may be in focus in the first image data and out of focus in the generated image. Conversely, an actual marker 300 may be in focus in both the first image data and the generated image, which allows the vehicle computer 110 to detect the actual marker 300 in the first image data and the generated image.

Upon determining that the unverified marker 300 is a projection 305 (see FIG. 3C), e.g., based on Equation 1, the vehicle computer 110 ignores the projection 305. That is, the vehicle computer 110 can determine not to operate the vehicle 105 to satisfy the marker 300 when the marker 300 is the projection 305. Additionally, the vehicle computer 110 can disable the idle mode, i.e., transitions the idle mode from the enabled state to the disabled state. In other words, the vehicle computer 110 can enable actuation of the propulsion component 125 of the vehicle 105. Additionally, the vehicle computer 110 can actuate one or more vehicle components 125 to resume vehicle operation from just prior to determining the marker 300 is unverified.

Upon determining that the unverified marker 300 is an actual marker 300 (see FIGS. 3A and 3B), e.g., based on Equation 1, the vehicle computer 110 can disable the idle mode. Additionally, the vehicle computer 110 may be programmed to verify the operating parameter associated with the actual marker 300. As one example, the vehicle computer 110 may identify an actual marker 300 that appears to specify one operating parameter but in fact does not (see FIG. 3B). For example, debris and/or illegitimate markings may obscure at least a portion of the marker 300 such that the vehicle computer 110 identifies the marker 300 as specifying a different operating parameter.

The vehicle computer 110 can verify the operating parameter associated with the actual marker 300 based on stored vehicle 105 operation data and/or operation data of a second vehicle 215 operating in the current lane 205. That is, the vehicle computer 110 can verify the operating parameter by analyzing the stored vehicle 105 operation data and/or operation data of a second vehicle 215 operating in the current lane 205 to determine how other vehicles 105 operate at the location of the actual marker 300. For example, if the stored (and/or second vehicle 215) operation data indicates that vehicles operate according to the operating parameter associated with the actual marker 300, then the vehicle computer 110 can verify the operating parameter associated with the actual marker 300. If the stored (and/or second vehicle 215) vehicle operation data indicates that vehicles do not operate according to the operating parameter associated with the actual marker 300, then the vehicle computer 110 can update the operating parameter associated with the actual marker 300 to correspond to the stored (and/or second vehicle 215) vehicle operation data.

Upon verifying the operating parameter associated with the actual marker 300, the vehicle computer 110 can operate the vehicle 105 based on the actual marker 300, e.g., in substantially the same manner as discussed above regarding operating the vehicle 105 based on the verified marker 300.

The remote server computer 140 may be programmed to update the map of the road 200, e.g., stored in a memory of the remote server computer 140, based on aggregated data. Aggregated data means data from a plurality of vehicle computers 110 that provide messages that is combined arithmetically and/or mathematically, e.g., by averaging and/or using some other statistical measure. That is, the remote server computer 140 may be programmed to receive messages from a plurality of vehicle computers 110 indicating markers 300, including a verification and locations at which the markers 300 are detected. Based on the aggregated data indicating the markers 300 and respective locations (e.g., an average number of messages, a percentage of messages, etc., indicating the markers 300 and respective locations), and taking advantage of the fact that messages from different vehicles 105 are provided independently of one another, the remote server computer 140 can update the map to specify the markers 300, including a verification and locations at which the markers 300 are detected, based on the vehicle 105 data. The remote server computer 140 can then transmit the map to a plurality of vehicles, including the vehicle 105, e.g., via the network 135.

Figure 4:
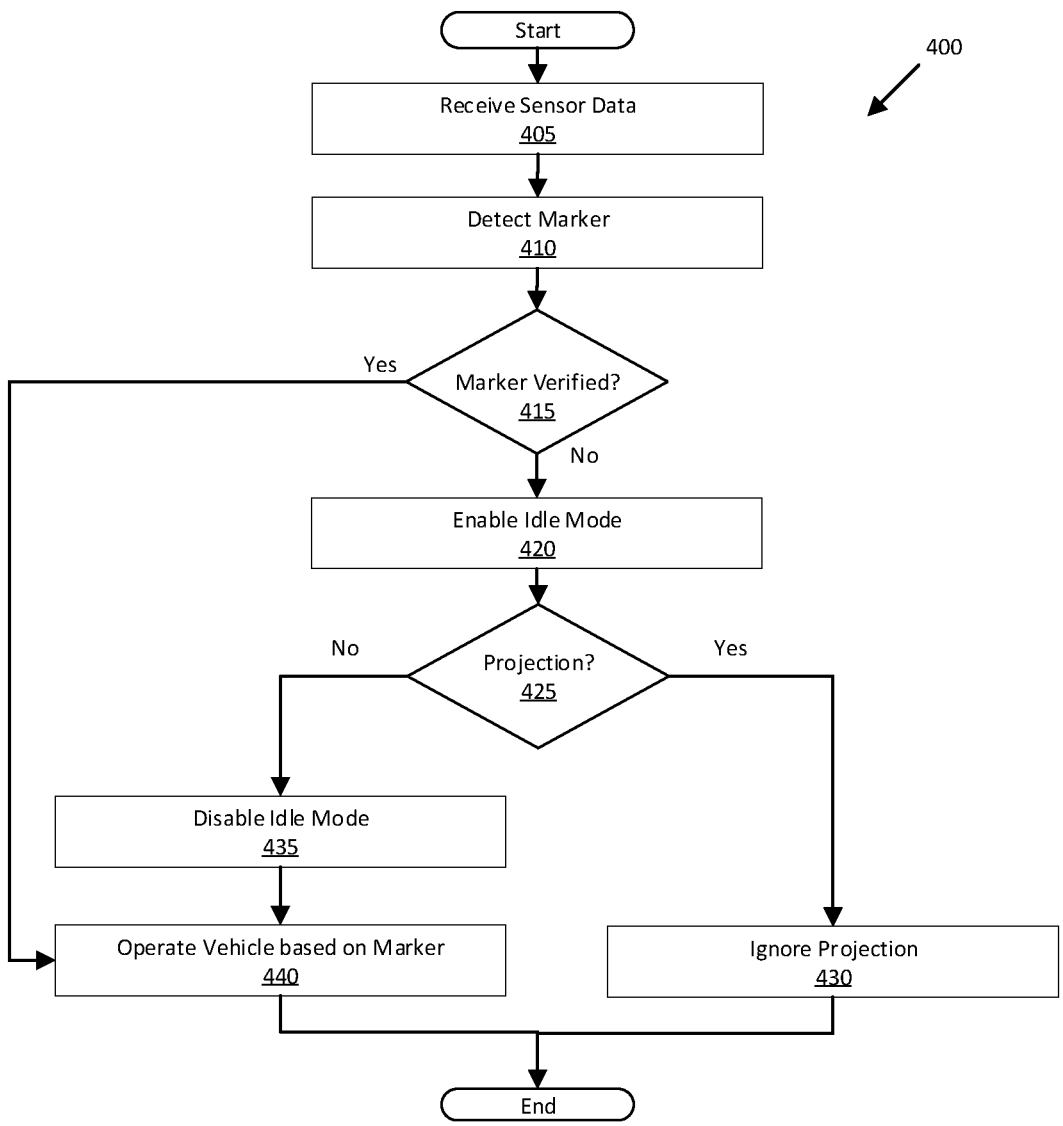
FIG. 4 is a flowchart of an example process for operating the vehicle.

FIG. 4 is a diagram of an example process 400 for operating a vehicle 105. The process 400 begins in a block 405. The process 400 can be carried out by a vehicle computer 110 included in the vehicle 105 executing program instructions stored in a memory thereof.

In the block 405, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive location data, e.g., geo-coordinates, of the vehicle 105, e.g., from a sensor 115, a navigation system, etc. Additionally, the vehicle computer 110 can receive image data, e.g., from one or more image sensors 115. The image data may include data about the environment around the vehicle 105, e.g., lane markings on a road 200, markers 300 alongside the road 200, other vehicles operating on the road 200, etc. The process 400 continues in a block 410.

In the block 410, the vehicle computer 110 detects a marker 300 based on first image data from a first image sensor 115, as discussed above. The process 400 continues in a block 415.

In the block 415, the vehicle computer 110 determines a verification of the detected marker 300. The vehicle computer 110 can determine a location of the detected marker 300 based on the first image data, as discussed above. The vehicle computer 110 can then compare the location of the detected marker 300 to a map to determine whether the marker 300 is verified or unverified, as discussed above. If the marker 300 is verified, the process 400 continues in a block 440. Otherwise, the process 400 continues in a block 420.

In the block 420, the vehicle computer 110 enables the idle mode, as discussed above. The process 400 continues in a block 425.

In the block 425, the vehicle computer 110 determines whether the unverified marker 300 is a projection 305. The vehicle computer 110 can determine a confidence score C based on Equation 1, as discussed above. The vehicle computer 110 can then compare the confidence score C to a threshold to determine whether the unverified marker 300 is an actual marker 300 or a project 305, as discussed above. If the vehicle computer 110 determines that the unverified marker 300 is a projection 305, then the process 400 continues in a block 430. Otherwise, the process 400 continues in a block 435.

In the block 430, the vehicle computer 110 ignores the projection 305. That is, the vehicle computer 110 determines not to operate the vehicle 105 based on the projection 305. Additionally, the vehicle computer 110 disables the idle mode, as discussed above. The process 400 ends following the block 430.

In the block 435, the vehicle computer 110 disables the idle mode, as discussed above. The process continues in the block 440.

In the block 440, the vehicle computer 110 operates the vehicle 105 based on the marker 300. That is, the vehicle computer 110 can actuate one or more vehicle components 125 according to the operating parameter associated with the marker 300, as discussed above. The vehicle computer 110 can determine the operating parameter associated with the marker 300 based on sensor 115 data, stored vehicle 105 operation data, and/or operation data of a second vehicle 215 operating in a current lane 205 of the road 200, as discussed above. The process 400 ends following the block 440.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
 while operating a vehicle, detect a marker via first image data from a first image sensor;
 upon failing to verify the marker via a map, actuate vehicle exterior lighting to illuminate the marker;
 then determine that the marker is one of an actual marker or a projection based on determining whether the marker is detected via second image data from the first image sensor; and
 upon determining the marker is the actual marker, operate the vehicle based on the actual marker.

2. The system of claim 1, wherein the instructions further include instructions to, upon detecting the marker, prevent at least one of a) actuation of a propulsion component in the vehicle, or b) a lane change operation until determining whether the marker is the actual marker or the projection.

3. The system of claim 1, wherein the instructions further include instructions to, upon determining the marker is the projection, ignore the projection.

4. The system of claim 1, wherein the instructions further include instructions to determine that the marker is one of the actual marker or the projection additionally based on determining whether the marker is detected via non-image sensor data.

5. The system of claim 1, wherein the instructions further include instructions to determine that the marker is one of the actual marker or the projection additionally based on stored vehicle operation data.

6. The system of claim 1, wherein the instructions further include instructions to determine that the marker is one of the actual marker or the projection additionally based on determining whether a second vehicle is operating according to the marker.

7. The system of claim 1, wherein the instructions further include instructions to determine that the marker is one of the actual marker or the projection additionally based on determining whether the marker is detected via image data from a second image sensor.

8. The system of claim 1, wherein the instructions further include instructions to, upon determining the marker is the actual marker, verify an operating parameter associated with the actual marker based on stored vehicle operation data.

9. The system of claim 1, wherein the instructions further include instructions to determine that the marker is one of the actual marker or the projection additionally based on determining whether the marker is detected for at least a threshold portion of a predetermined time.

10. The system of claim 1, wherein the instructions further include instructions to, upon generating an image from the first image data, determine that the marker is one of the actual marker or the projection additionally based on determining whether the marker is detected in the image.

11. The system of claim 10, wherein the instructions further include instructions to generate the image by using a virtual sensor having a same perspective of the marker as the first image sensor and having a different magnification than the first image sensor.

12. The system of claim 1, wherein the instructions further include instructions to provide a message specifying the marker is one of the actual marker or the projection to a remote computer.

13. The system of claim 1, wherein the instructions further include instructions to, upon verifying the marker via the map, operate the vehicle based on the verified marker.

14. The system of claim 13, further comprising a remote computer including a second processor and a second memory, the second memory storing instructions executable by the second processor to generate the map based on aggregated data including messages from a plurality of vehicles identifying the marker.

15. A method, comprising:
while operating a vehicle, detecting a marker via first image data from a first image sensor;
upon failing to verify the marker, actuating vehicle exterior lighting to illuminate the marker;
then determining that the marker is one of an actual marker or a projection based on determining whether the marker is detected via second image data from the first image sensor; and
upon determining the marker is the actual marker, operating the vehicle based on the actual marker.

16. The method of claim 15, further comprising determining whether the marker is one of the actual marker or the projection additionally based on determining whether the marker is detected via non-image sensor data.

17. The method of claim 15, further comprising determining whether the marker is one of the actual marker or the projection additionally based on stored vehicle operation data.

18. The method of claim 15, further comprising determining whether the marker is one of the actual marker or the projection additionally based on determining whether a second vehicle is operating according to the marker.

19. The method of claim 15, further comprising determining whether the marker is one of the actual marker or the projection additionally based on determining whether the marker is detected via image data from a second image sensor.

20. The method of claim 15, further comprising determining whether the marker is one of the actual marker or the projection additionally based on determining whether the marker is detected for a predetermined time.

* * * * *